June 14, 1927.

H. W. MEYER

VEGETABLE CLEANER

Filed May 25, 1925

INVENTOR.
HENRY W. MEYER.

BY

ATTORNEYS.

June 14, 1927.
H. W. MEYER
VEGETABLE CLEANER
Filed May 25, 1925   2 Sheets-Sheet 2
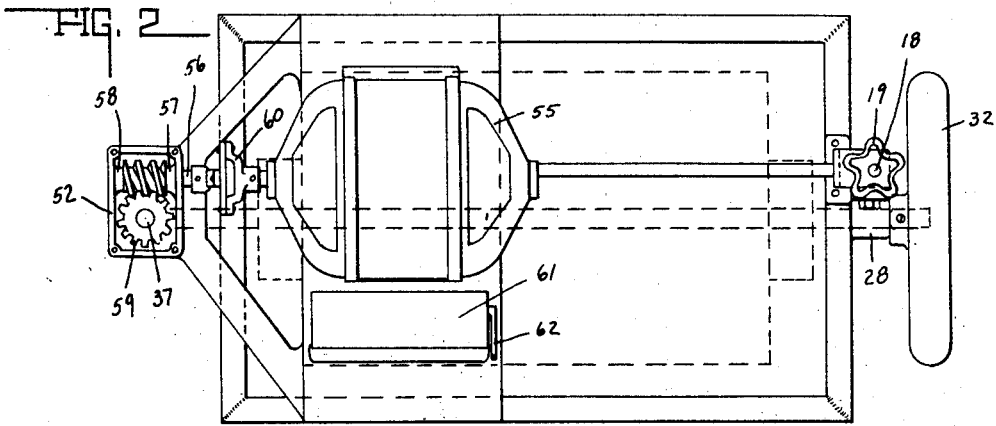
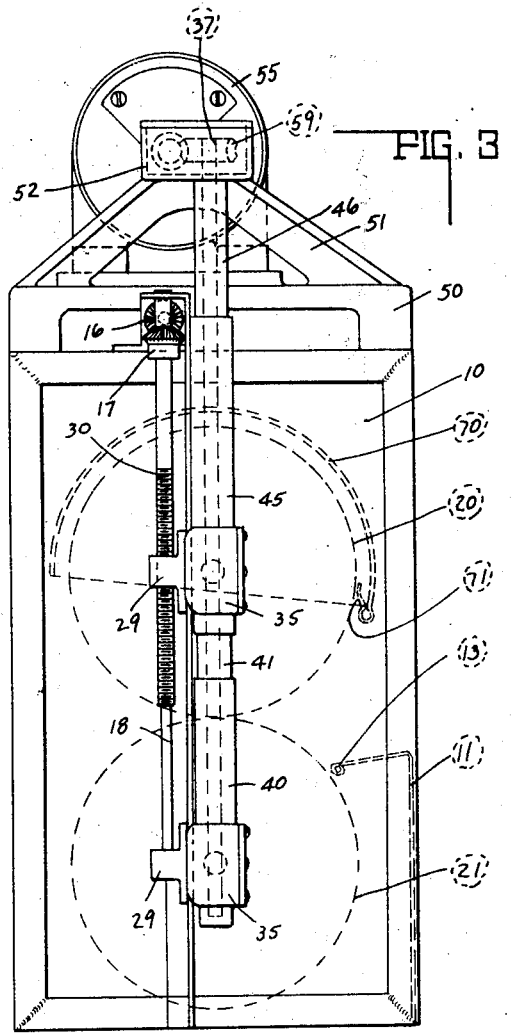
INVENTOR.
HENRY W. MEYER.
BY
*Lockwood & Lockwood*
ATTORNEYS.

Patented June 14, 1927.

1,632,142

UNITED STATES PATENT OFFICE.

HENRY WM. MEYER, OF INDIANAPOLIS, INDIANA.

VEGETABLE CLEANER.

Application filed May 25, 1925. Serial No. 32,698.

This invention relates to a cleaning machine for vegetables and the like and is of the character shown in my prior Patent, No. 1,495,758, dated May 27, 1924.

The chief object of the present invention is to improve the machine shown in the prior patent before mentioned, whereby the various parts are not only protected but a more positive drive is secured.

The chief feature of the invention consists in certain structural rearrangements and certain structural simplifications whereby a device of the character generically disclosed in the before mentioned patent can be more economically produced and will operate more efficiently.

The full nature of the invention will be understood from the accompanying drawings and the following description and claims:

Fig. 2 is a top plan view of the invention.

Fig. 3 is a side elevational view thereof taken from the left hand side of Figs. 1 and 2.

Figure 1:
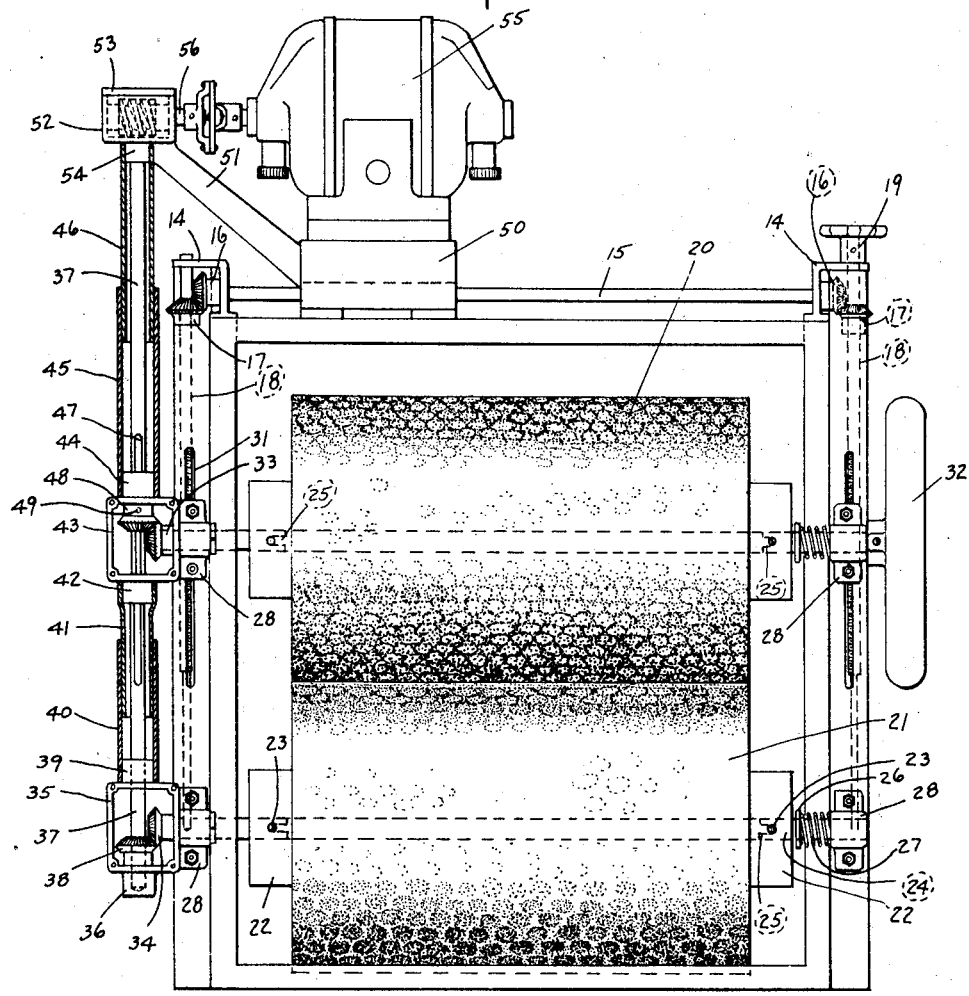
Fig. 1 is a front view of the invention, parts being broken away or omitted to show other parts in detail and in section.

In the drawings 10 indicates a suitable housing of rectangular character which is of suitable construction. For example, angle iron covered with metal sheeting. The front face of the housing or a portion thereof is left open and adjacent thereto and closing the lower portion thereof is a lower guard or rest member 11 having an inturned flange 12 terminating in a beaded portion 13. Said construction is very similar to and the full equivalent of that disclosed in the before mentioned patent.

The housing supports a pair of top brackets which are complementary and are herein indicated by the numeral 14. Each bracket is provided with a pair of transversely positioned bearings and a shaft 15 extends through a pair of said bearings which are aligned and the bracket enclosed ends of said shaft 15 carry the bevel gears 16. The bevel gear 16 meshes with the gear 17 mounted upon a shaft 18 which is journaled in the other and transversely positioned bearing of the bracket 14. Rotation of any one of the three shafts, therefore, simultaneously will rotate both shafts 18. Herein one shaft 18 is shown extended and carries a hand wheel 19 for actuating one of the shafts 18 and, therefore, the other shaft 18, as well. The before mentioned construction is the full equivalent of that disclosed in the prior patent.

Extending transversely of the housing or casing is an upper brush 20 and positioned beneath the same is a lower brush 21. These brushes 20 and 21 are similar and, therefore, a description of one and its mounting will suffice for them both. The brushes are provided with cores which have longitudinal openings forming bearings 22 which carry a pin 23. A stub shaft 24 is suitably notched as at 25 and carries a bearing plate 26 upon which a coiled and concentric spring 27 bears. The other end of the spring bears upon the frame or a bracket mounted thereon, and herein said bracket is indicated generally by the numeral 28. Since the stub shaft 24 is slidably as well as rotatably mounted in the bearing 27, the complementary ends of the brush and stub shaft are so arranged that a detachable driving support is secured. This construction permits of ready replacement of the brushes by sliding the shaft 24 in opposition to spring 27 until the notch 25 disengages the pin 23. Both ends of the brush are similarly mounted and both brushes are similarly mounted.

Each of the brackets 28 is provided with a rearward extension 29 and herein the lower rearward projection 29 rotatably supports the lower and reduced end of the shaft 18. The upper projection 29 is threaded and is carried by the threaded portion 30 of the shaft 18. By referring to Figs. 1 and 3, it will be understood that the frame 10 is provided with an elongated aperture or slot 31 and whereas the lower bearing 28 is rigidly associated with the frame 10, the upper bearing 28 is slidably associated therewith and the bolts of said upper bearing are positioned in the slot 31 and secure the projecting portion 29 to the bearing portion 28. Rotation of the hand wheel 19, therefore, simultaneously elevates to an equal extent the upper bearings, or lowers the same, thereby elevating or lowering the brush 20 with respect to the brush 21.

One of the upper stub shafts 24 is extended and carries a fly-wheel 32. The opposite stub shaft carries a bevel gear 33 and the lower and similarly positioned stub shaft 24 carries a similar bevel gear 34. A gear housing 35 is rigidly supported and includes a bearing 36 for the lower end of the shaft 37. The housing 35 encloses a bevel gear 38 which meshes with the bevel gear 34 and thus the shaft 37 drives the brush 21. Oppositely positioned with respect to the projection 36 is a projection or collar 39 and enclosing said collar and extending upwardly therefrom is a sleeve 40 with which is telescopically associated the sleeve 41. The sleeve 41 is similarly associated with a bearing projection 42 carried by a housing 43, which housing is movable with the upper and movable bearing 28. Said housing 43 encloses the gear 33.

The shaft 37 extends upwardly through the housing 43 and is rotatably and slidably supported by the bearings 42 and 44 oppositely positioned thereon. Projecting upwardly from the housing 43 and carried by the projection 44 is a sleeve 45 and telescopically associated therewith is another sleeve 46. The shaft 37 is herein shown provided with a keyway 47 which may be a groove or may be a slot extending therethrough. The bevel gear 48, meshing with the bevel gear 33 in the housing 43 and enclosed thereby, carries a pin 49 that rides in the slot or groove 47 and thus has relative sliding movement, but is prevented from relative rotative movement with respect to said shaft. Thus, as the shafts 18 are rotated to elevate or lower the upper brush, the gear 48 with the housing 43 is similarly elevated and lowered and this can be accomplished while the shaft 37 is being driven without in any way interfering with either the driving or the adjusting of the upper and lower rolls.

Suitably secured upon the upper portion of the casing 10 is a motor bracket 50. This has an upwardly extending arm 51 which terminates in a gear box 52 having a cover 53 and an oppositely extending projection 54, which forms a bearing for the shaft 37 and also is adapted to seat the upper end of the tube 46. It will be understood that the tube 46 is preferably secured to the housing 52 and the tube 40 is secured to the housing 35; while the two movable sections of the telescopic tubing, being 45 and 41, are carried by the movable gear housing 43.

A motor 55 is suitably supported upon the base bracket 50 and said bracket 50 is so fashioned as to detachably receive various makes of motors of the requisite capacity and of the requisite type of current necessary. Mounted upon an axis parallel to the stub shafts 24 is a shaft 56. This shaft 56 is mounted in bearings 57 provided within the housing 52. There is carried by said shaft 56 in said housing a worm 58, which meshes with a worm wheel 59 carried by the upper end of the shaft 37. The motor shaft is herein shown connected to the shaft 56 through a clutch of flexible drive construction indicated generally by the numeral 60.

A housing 61 including an exposed handle 62 may be carried by either the base bracket 50 or the motor 55, as found most convenient, and said housing 61 adapted to contain motor protective devices necessary for controlling and protecting the motor 55.

As shown clearly in Fig. 3, a substantially semi-cylindrical shell 70 is rotatably associated with the upper stub shafts 24 and is elevated and lowered therewith. This forms an upper guard for the upper brush and prevents splashing. Should splashing thus occur, the liquid either drains downwardly from the rear end of the guard or drains forwardly and is collected by the upturned portion 71. It is discharged laterally thereby to either or both sides of the brush and thus does not drip directly downwardly upon the operator's hands or the vegetables positioned between the two brushes.

It is to be understood that the housings, 52, 43 and 35 are so constructed that they may be packed with grease and thus exceptionally noiseless operation is secured. The entire construction may be associated with a trough or stand of the character indicated in the before mentioned patent, or may be positioned upon a bench provided with a drain and fresh water supplied to the rolls while said rolls are operating.

The invention claimed is:

1. A vegetable cleaner of the character described including a framework having a lateral aperture therein, a pair of oppositely rotating scrubbing rolls with their axes parallel to each other and the lateral aperture, an upper guard within the framework and adjacent the aperture and the upper roll, and means for adjustably and pivotally supporting said upper guard.

2. A vegetable cleaner including a framework having a lateral aperture therein, a pair of oppositely rotating scrubbing rolls with their axes parallel to each other and the lateral aperture, and an upper guard within the framework and adjacent the aperture and the upper roll and including a drain collection portion adapted to discharge laterally toward the end of the brush.

3. A device of the character described in claim 1, characterized by said guard including a collection and lateral discharge portion.

In witness whereof, I have hereunto affixed my signature.

HENRY WM. MEYER.